Patented May 29, 1934

1,961,120

UNITED STATES PATENT OFFICE 1,961,120

DEHYDRATION OF NITROCELLULOSE AND PRODUCTION OF LACQUERS CONTAINING THE SAME

Carroll A. Hochwalt and Paul E. Marling, Dayton, Ohio, assignors to The Sharples Solvents Corporation, Philadelphia, Pa., a corporation of Delaware No Drawing. Application August 19, 1933, Serial No. 685,968

3 Claims. (Cl. 134—79)

The present invention relates to the preparation of nitrocellulose for shipment or for mixture with solvents, diluents and other ingredients in the formulation of lacquers.

While there are a number of commercially applicable methods known for the production of nitrocellulose, it is necessary in connection with the practice of each of these methods to thoroughly wash the nitrated cotton in order to remove the free acids which it has absorbed from the nitrating mixture. It is naturally desirable to separate the major portion of the wash water remaining therein after the washing operation and this has been commonly accomplished by pressing the water from the wet cotton and washing the pressed cotton with ethyl alcohol, alcohol of 90–95% concentration being ordinarily used for this purpose. At the conclusion of this last washing operation, the cotton has been shipped without removal of all of the ethyl alcohol used in the last washing operation therefrom, it being common in the production of one-half second nitrocellulose to ship such cotton while it retains about 30% by weight of ethyl alcohol.

This method of shipping the cotton has the advantage that it minimizes the danger of ignition and explosion. It has also heretofore been considered that the alcohol used for wetting purposes forms a useful ingredient of lacquers. The cotton shipped in this manner still contains a substantial proportion of moisture, however, and this moisture thus forms an ingredient of any lacquer compounded from the cotton.

The present invention rests upon the discovery that certain objectionable phenomena, and particularly the phenomena known as orange peel and silking, encountered in the use of lacquers are largely due to the presence of this residual moisture and the presence of ethyl alcohol in the nitrocellulose or the lacquer. It has now been discovered that these phenomena can be eliminated in a large number of instances by the more adequate removal of the moisture and by elimination of the ethyl alcohol. The objects of the invention are therefore to effect a more complete dehydration of nitrocellulose than has heretofore been accomplished and to ship the dehydrated nitrocellulose and/or prepare a lacquer therefrom in the substantial absence of water and to produce a lacquer from such nitrocellulose which is substantially free of ethyl alcohol.

In the practice of the invention, the nitrocellulose from the water washing operation is first pressed in the conventional manner to effect the removal of the major part of the water therefrom. It is then washed with ethyl alcohol in the same manner as in prior practice.

In view of the fact that the ethyl alcohol used for the washing operation contains about 8% water and has a natural affinity for water, the ethyl alcohol remaining in the nitrocellulose will still contain a substantial proportion of moisture. Certain features of this invention pertain to the removal of this residual moisture. In order to effect such removal, the nitrocellulose is first pressed to remove most of the mixture of ethyl alcohol and water which it contains and the remaining mass is thereafter washed with an alcohol containing three or more carbon atoms. It may, for example, be washed by flowing amyl alcohol therethrough, the amyl alcohol serving to absorb the mixture of water and ethyl alcohol and thus effect the substantial removal of both of these constituents from the mass. When this washing operation has removed substantially all of the mixture of ethyl alcohol and water, the nitrocellulose may be wet with a higher alcohol such as the alcohol used for the last washing operation.

Nitrocellulose which has been dehydrated as described above may be shipped with comparative safety or it may be directly used in the formulation of lacquers. It has been found to be remarkably superior to nitrocellulose treated in accordance with methods of the prior art when used in the formulation of lacquers, the tendency of such lacquers to undergo the undesirable phenomena of orange peel and silking being decreased or eliminated by reason of such dehydration treatment.

We are aware of the fact that the use of higher alcohols for the purpose of wetting nitrocellulose has been suggested heretofore, but our present method of partially dehydrating the nitrocellulose by washing it with ethyl alcohol and thereafter washing the ethyl alcohol and water from the nitrocellulose by means of a higher alcohol having an affinity for the mixture of ethyl alcohol and water, is far superior to these prior art methods, in that it effects a thorough removal of water from the nitrocellulose and thus produces a nitrocellulose which is superior from the standpoint of lacquer formulation. We have found that when higher alcohols containing more than three carbon atoms, such as amyl alcohol, butyl alcohol or propyl alcohol, are used directly for wetting nitrocellulose without previously treating with ethyl alcohol, the lacquer produced from such nitrocellulose is subject to the objectionable phenomena above described.

We have further found the anhydrous ethyl alcohol alone is undesirable for use in wetting nitrocellulose. When anhydrous ethyl alcohol is used to wet nitrocellulose, a considerable loss of cotton occurs, due to the solubility of the cotton in the anhydrous ethyl alcohol. Moreover, it is found that after anhydrous ethyl alcohol has been used as a wetting agent, a gelatinous film remains in and around the particles of cotton. The resulting nitrocellulose tends to form solid masses, and is difficult to use in lacquer formulation.

As stated above, the present invention provides a nitrocellulose substantially free from water and from ethyl alcohol, and capable of producing lacquers which are remarkably free from undesirable phenomena. In the formulation of lacquers from nitrocellulose washed and/or wet in accordance with our invention, it is, of course desirable that lower alcohols, such as methyl and ethyl alcohols, be substantially eliminated from the lacquer formulæ and we accordingly prefer to produce lacquers which are not only freed of such lower alcohol by the above-described washing operation, but in which the solvents, diluents and other ingredients used in the formulation of the lacquer do not include or contain such lower alcohols.

An example of our process is as follows: 100 grams of water wetted nitrocellulose containing 36.5% of water, is washed with 90% ethyl alcohol until all of the original water is removed. The washing operation is complete when the specific gravity of the wash ethyl alcohol is the same as the original ethyl alcohol used. We have found for the above quantity of nitrocellulose that approximately 500 c. c. of ethyl alcohol is required. The ethyl alcohol wetted cotton is then further washed with butyl alcohol until all of the ethyl alcohol has been removed. The washing operation is complete when the specific gravity of the wash butyl alcohol is the same as the original butyl alcohol used. For this operation it was found that 500 c. c. of butyl alcohol was required to entirely remove the ethyl alcohol. The respective alcohols may be recovered by fractional distillation.

Another example is as follows: 200 grams of water wetted nitrocellulose containing 36.5% of water is washed with 90% ethyl alcohol until all of the water is removed. The washing operation is complete when the specific gravity of the wash ethyl alcohol is the same as that of the original ethyl alcohol used. We have found for the above quantity of nitrocellulose that approximately 1000 c. c. of ethyl alcohol is required. The ethyl alcohol wetted cotton is then further washed with pentasol until all of the ethyl alcohol has been removed. The washing operation is complete when the specific gravity of the pentasol is the same as the original pentasol used. For this operation it was found that 1000 c. c. of pentasol was required to entirely remove the ethyl alcohol. The respective alcohols may be recovered by fractional distillation.

A typical lacquer formula using pentasol wetted cotton is as follows:

|  | Grains |
|---|---|
| Pentasol wetted ½ second cotton substantially free of water (pentasol 28%) | 110 |
| Ester resin solution | 20 |
| Dibutyl phthalate | 35 |
| Pentacetate | 130 |
| Pentasol | 65 |
| Toluol | 90 |
| Petroleum naphtha | 90 |
| Chrome yellow pigment paste | 120 |

Paste
68% chrome yellow
14% rosin ester
14% xylol

The above lacquer is then thinned with 1 to 1½ parts of thinner by volume. The thinner formula is as follows:

|  | Per cent |
|---|---|
| Pentacetate | 35 |
| Pentasol | 17 |
| Toluol | 24 |
| Troluoil | 24 |

In a typical example of the use of such a lacquer, this thinned lacquer was sprayed on the object. Three such coatings were made. The lacquer films were rubbed and polished but it was found that they did not require sanding. The lacquer film had a high gloss and was practically free from any orange peel or silking.

While the features herein described constitute preferred embodiments of our invention it is to be understood that the invention is not limited to these precise features, and that changes may be made therein without departing from the scope of the invention which is defined in the appended claims.

We claim:

1. The method of producing a lacquer which comprises washing a wet mass consisting of nitrocellulose and water with a mixture of water and a lower alcohol having a strong natural affinity for water, thereafter thoroughly washing the nitrocellulose containing said alcohol and a substantial proportion of water with a higher alcohol having a natural affinity for a mixture of water and the lower alcohol to effect substantially complete dehydration thereof and removal of lower alcohol therefrom and finally mixing the dehydrated nitrocellulose with the desired ingredients to produce the desired lacquer.

2. The method of producing a lacquer which comprises washing a wet mass consisting of nitrocellulose and water with a mixture of water and a lower alcohol chosen from the group consisting of methyl and ethyl alcohols, thereafter thoroughly washing the nitrocellulose containing said alcohol and a substantial proportion of water with a higher alcohol having a natural affinity for a mixture of water and the lower alcohol to effect substantially complete dehydration thereof and removal of lower alcohol therefrom and finally mixing the dehydrated nitrocellulose with the desired ingredients to produce the desired lacquer.

3. The method of producing a lacquer which comprises washing a wet mass consisting of nitrocellulose and water with a mixture of water and ethyl alcohol and thereafter thoroughly washing the nitrocellulose containing said alcohol and a substantial proportion of water with amyl alcohol to effect substantially complete dehydration thereof and removal of ethyl alcohol therefrom and finally mixing the dehydrated nitrocellulose with the desired ingredients to produce the desired lacquer.

CARROLL A. HOCHWALT.
PAUL E. MARLING.

CERTIFICATE OF CORRECTION.

Patent No. 1,961,120. May 29, 1934.

CARROLL A. HOCHWALT, ET AL.

It is hereby certified that error appears in the printed specification of the above numbered patent requiring correction as follows: Page 2, line 1, for "the" read that; and line 66, for "Grains" read Grams; and that the said Letters Patent should be read with these corrections therein that the same may conform to the record of the case in the Patent Office.

Signed and sealed this 19th day of June, A. D. 1934.

Bryan M. Battey (Seal) Acting Commissioner of Patents.